US006577601B1

(12) United States Patent
Wolpert

(10) Patent No.: US 6,577,601 B1
(45) Date of Patent: Jun. 10, 2003

(54) MASKED PROPORTIONAL ROUTING

(75) Inventor: David H. Wolpert, Los Gatos, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/369,380

(22) Filed: Aug. 5, 1999

(51) Int. Cl.[7] ................................. H04Q 1/00
(52) U.S. Cl. .................. 370/238; 370/231; 370/395.21; 370/401; 709/102; 709/241
(58) Field of Search ................................ 370/229, 230, 370/230.1, 231, 238, 252, 395.21, 395.31, 395.32, 395.43, 401, 402; 709/200, 227, 228, 235, 239, 240, 241, 102, 105

(56) References Cited

U.S. PATENT DOCUMENTS

| | | | |
|---|---|---|---|
| 4,885,780 A | 12/1989 | Gopal et al. | 379/221 |
| 4,967,345 A | 10/1990 | Clarke et al. | 364/200 |
| 5,430,729 A | 7/1995 | Rahnema | 370/409 |
| 5,854,903 A | 12/1998 | Morrison et al. | 395/200.79 |

OTHER PUBLICATIONS

C.Y.Lee, "Analysis of Switching Networks", Bell Sys. Tech. Jour., vol. 35 (1955) pp. 1287–1315.
E.W. Dijkstra, "A Note on Two Problems in Connexion with Graphs", Numerische Mathematik, vol. 1 (1959) pp. 269–271.
F. Kamoun & L. Kleinrock, "Stochastic Performance Evalaution of Hierarchical Routing" Computer Networks, vol. 3 (1979) pp. 337–353.

M. Schwartz & T.E. Stern, "Routing Techniques Used in Computer Commun. Networks", I.E.E.E. Trans. Communs., vol. 28(1980).

(List continued on next page.)

Primary Examiner—Dang Ton
Assistant Examiner—Shick Hom
(74) Attorney, Agent, or Firm—Robert M. Padilla; Sue H. Palk; Carla M. Wong

(57) ABSTRACT

Distributed approach for determining a path connecting adjacent network nodes, for probabilistically or deterministically transporting an entity, with entity characteristic $\mu$ from a source node to a destination node. Each node i is directly connected to an arbitrary number $J(\mu)$ of nodes, labeled or numbered $j=j1, j2, \ldots, jJ(\mu)$. In a deterministic version, a $J(\mu)$-component baseline proportion vector $p(i;\mu)$ is associated with node i. A $J(\mu)$-component applied proportion vector $p^*(i;\mu)$ is determined from $p(i;\mu)$ to preclude an entity visiting a node more than once. Third and fourth $J(\mu)$-component vectors, with components iteratively determined by $\text{Target}(i;n(\mu);\mu)_j = \alpha(\mu) \cdot \text{Target}(i;n(\mu)-1;\mu)_j + \beta(\mu) \cdot p^*(i;\mu)_j$ and $\text{Actual}(i;n(\mu);\mu)_j = \alpha(\mu) \cdot \text{Actual}(i;n(\mu)-1;\mu)_j + \beta(\mu) \cdot \text{Sent}(i;j'(\mu);n(\mu)-1;\mu)_j$, are computed, where $n(\mu)$ is an entity sequence index and $\alpha(\mu)$ and $\beta(\mu)$ are selected numbers. In one embodiment, at each node i, the node $j=j'(\mu)$ with the largest vector component difference, $\text{Target}(i;n(\mu);\mu)_j' - \text{Actual}(i;n(\mu);\mu)_j'$, is chosen for the next link for entity transport, except in special "gap" circumstances, where the same link is optionally used for transporting consecutively arriving entities. The network nodes may be computer-controlled routers that switch collections of packets, frames, cells or other information units. Alternatively, the nodes may be waypoints for movement of physical items in a network or for transformation of a physical item. The nodes may be states of an entity undergoing state transitions, where allowed transitions are specified by the network and/or the destination node.

82 Claims, 3 Drawing Sheets

OTHER PUBLICATIONS

Curtis Villamizar et al, IS–IS Optimized Multipath (ISIS–OMP), UUNET, Internet Engineering Task Force, Feb. 22, 1999.

Curtis Villamizar, "OSPF Optimized Multipath (OSPF–OMP)", UUNET, Internet Engineering Task Force, Feb. 24, 1999.

Curtis Villamizar, "MPLS Optimized Multipath (MPLS–OMP)", UUNET, Internet Engineering Task Force, Apr. 26, 1999.

MASKED PROPORTIONAL ROUTING

ORIGIN OF THE INVENTION

The invention described herein was made by an employee of the United States Government and may be manufactured and used by or for the Government for government purposes without payment of any royalties thereon or therefor.

TECHNICAL FIELD OF THE INVENTION

This invention relates to routing of entities, such as information packets or physically transportable items, from a source to a destination in a network.

DISCUSSION OF THE PRIOR ART

Many networks share as a component one or more instances of a "routing procedure" by which, in response to a "routing request" that a particular entity be transported from a first node "A" to eventually arrive at a second node "B" in the network, one or more "links" from a path that connects node A and node B are selected.

As an example, at the network layer 3 in a digital computer or telecom network, these nodes may be data switching routers, and each associated link may be a direct connection between two neighboring routers. The entity to be transported may be a small as a single packet, frame, cell, flow control signal, etc. (collectively referred to herein as "packets") or as large as a set of packets in a selected format (delineated by time, by a sequence number or running count of packets routed through a node, by an originating source and/or ultimate destination, by the time the entity was transported from the source node). A particular instance occurs when the routing procedure is resident on a single router or switch, and the procedure is used only to select the next link for the entity to follow on the path to the entity's ultimate destination B. After the procedure is completed, the entity is transported along the chosen link, and the procedure is repeated at the node at the other end of the chosen link.

Alternatively, the entity may be the contents of a temporally open circuit for which the procedure selects an ordered set of consecutive links from node A to node B. Alternatively, the procedure may be used as part of an intermediate scheme, as in flow control or in an ATM-switched network. Well known routing algorithms include distance vector (Bellman-Ford), RIP, link state, ISIS and OSPF, and are discussed in some detail in Radia Perlman, Interconnections: Bridges and Routers, Addison Wesley Publishing, Reading, Mass., 1992, Chapters 9 and 10.

As another example, the entity may be a physical item to be transported, such as an aircraft or other vehicle, along a path from one waypoint to the next waypoint. More generally, the entity can be any item (data, physical object, etc.) that is to be transported from a source node to a destination node in a network, using a path including one or more links that connect nodes in the network.

More generally, the nodes can be states of the entity, the links are allowed transitions of the entity, and the procedure is used to schedule transitions of entities so that the entities attain their ultimate states. In particular, the invention may be appropriate when it is preferred that no entity visit the same state twice. As a particular example that need not involve transport of the entities, the entities may be physical goods being manufactured or otherwise transformed at one or more nodes, the nodes may represent states of these goods, an ultimate entity destination may be the state of a completed good, and the routing procedure may be a dynamic scheduling algorithm controlling a production schedule or chain for these goods.

A routing procedure can involve techniques from the established field of reinforcement learning, as discussed by R. S. Sutton and A. G. Barto in Reinforcement Learning: An Introduction, MIT Press, Cambridge, Mass., 1998. In a simple instance of this, the routing procedure can be provided with numerical "reward signals" from the environment periodically, with the reward signals reflecting values of a cost function. The procedure uses these reward signals together with other received information to statistically determine at run time how, if at all, to modify its response to a given routing request in order to increase the expected value(s) of the reward signals the procedure will receive in the future. A choice by a system's designer as to how to select or implement the reward signals to be provided to the routing procedure may be determined by what behavior(s) the designer wishes to promote or to discriminate against, among other things. If, for example, the designer wishes to maximize global traffic throughput, a value of throughput, averaged over a selected time interval, may be used to determine the reward signal(s) for the routing procedure.

Routing of entities on a network often relies on a routing procedure from a source A to a destination B that may be characterized as "all-or-nothing": if the value of a given cost function associated with following one possible path connecting node A and node B is estimated to be lower than the value of the cost function for any other path considered that connects A and B, only links from the first path are selected, until such time as new cost estimates are available. Adoption of this all-or-nothing approach has several disagreeable consequences.

First, by always selecting links that are part of the same path, the value of the cost function associated with the selected links is likely to increase significantly. For example, this overloading may increase network congestion and/or transportation failure (entity loss or misdelivery) on the chosen link(s). Second, because the value of the cost function associated with the selected links increases so substantially and abruptly, it is likely that the selected links will promptly be de-selected as part of a chosen path, thus producing some instability in the behavior of the network.

Third, the network has no opportunity to make a graceful transition from a first set of links to a second set of links, for example, when one or more links in the first set becomes increasingly costly (or inoperative). Fourth, adoption of an all-or-nothing routing procedure requires "hard-edged" use of a cost criterion that allows little or no provision for uncertainty in modeling of the network processes. In particular, discrepancies between estimated and actual values of the cost function may be magnified using such a procedure, due to associated instabilities in the network, and, simultaneously, degradation in the network's performance associated with any particular discrepancy level may be increased (system "brittleness").

What is needed is a routing procedure that selects links from a collection of two or more A-B paths on a network in a manner that does not always choose the same link(s), even for two instances of the procedure that have identical estimated values of the associated cost functions. Preferably, this procedure should permit a graceful transition from one set of links to another set of links (either partly overlapping or completely non-overlapping) as the circumstances of network operation change with time. Preferably, this procedure should be adaptable to separately optimize different portions of the network. Preferably, this procedure should permit compensation for probabilities that a network will behave in one way or another, at a given time or over a succession of times. Preferably, this procedure should be usable in networks where some of the routing decisions are made by different procedures (i.e., two or more independent routing procedures are used), without requiring substantial changes in the underlying protocols and/or formats associated with the entities being transported, and with at most modest increases in communications regarding network status. Preferably, this procedure will not lead to "cycles", in which an entity visits the same node twice. Preferably, this procedure can be modified so that separate entities moving from node A to node B do not arrive out of order.

SUMMARY OF THE INVENTION

These needs are met by the invention, which provides an approach that accounts for link/path traffic and/or link/path costs on a network with N nodes ($N \geq 2$). Consider a particular node i in the network that is directly connected to J other nodes, labeled or numbered j=j1, j2, . . . , jJ. A "baseline proportion vector" $p(i;\mu)$, having J components, is associated with node i, where $p(i;\mu)$ is used to determine how to transport an entity, having a characteristic or set of characteristics designated by $\mu$, from node i. Examples of such characteristics g include the originating source, the ultimate destination, the routing priority, and the time the entity was last transported from the source node.

In one embodiment of the invention, a $J(\mu)$-component "applied proportion vector" $p^*(i;\mu)$ is determined from $p(i;\mu)$ so that no entity is ever transported from the node i to a connected node j if the jth component $p^*(i;\mu)_j=0$. With this determination employed for all link selections for an entity, that entity will not visit any node more than once before the entity reaches its destination node. In one embodiment of the invention, two more $J(\mu)$-component vectors, Target(i;n($\mu$);$\mu$) and Actual(i;n($\mu$);$\mu$) are computed and used, where n=n($\mu$) is a sequence number or count at the node i that may depend upon one or more of the characteristics $\mu$ of the entity being transported and the associated routing request. At each node i for an entity with characteristic $\mu$, for selected values of n($\mu$), a new determination is made of the i-to-j link, j=j'($\mu$), with the largest value of the difference Target(i;n($\mu$);$\mu$)–Actual(i;n($\mu$);$\mu$). The entity is transported along the i-to-j'($\mu$) link. The vectors Target(i;n($\mu$);$\mu$) and Actual(i;n($\mu$);$\mu$)) are computed iteratively from the relations Target(i;n($\mu$);$\mu$)=$\alpha(\mu)$·Target(i;n($\mu$)–1;$\mu$)+$\beta(\mu)$·$p^*(i;\mu)$ and Actual(i;n($\mu$)+1;$\mu$)=$\alpha(\mu)$·Actual(i;n($\mu$);$\mu$)+$\beta(\mu)$·Sent(i;j'($\mu$);n($\mu$);$\mu$). Here, $\alpha(\mu)$ and $\beta(\mu)$ are selected real number and Sent(i;j'($\mu$);n($\mu$);$\mu$) is a $J(\mu)$-component vector with component j=j'($\mu$) having the value 1 and all other components having the value 0. The number $J(\mu)$ of nodes directly connected to node i, the originating source node A and/or the ultimate destination node B can vary with the characteristic $\mu$.

The objective of the invention is to optimize some measure of network performance, such as overall entity throughput, amount of discarded entities, entity errors, misdelivered entities, minimum bandwidth or other corresponding effort required, financial cost of transporting an entity, average or minimum or maximum time delay for entity delivery, priority level for an entity, or some other measure of quality of service (QOS) on the network. Currently, many such measures have associated procedures that are used in actual networks. However, most existing procedures do not provide an optimal performance according to the associated measures.

DETAILED DESCRIPTION OF THE INVENTION

Figure 1:
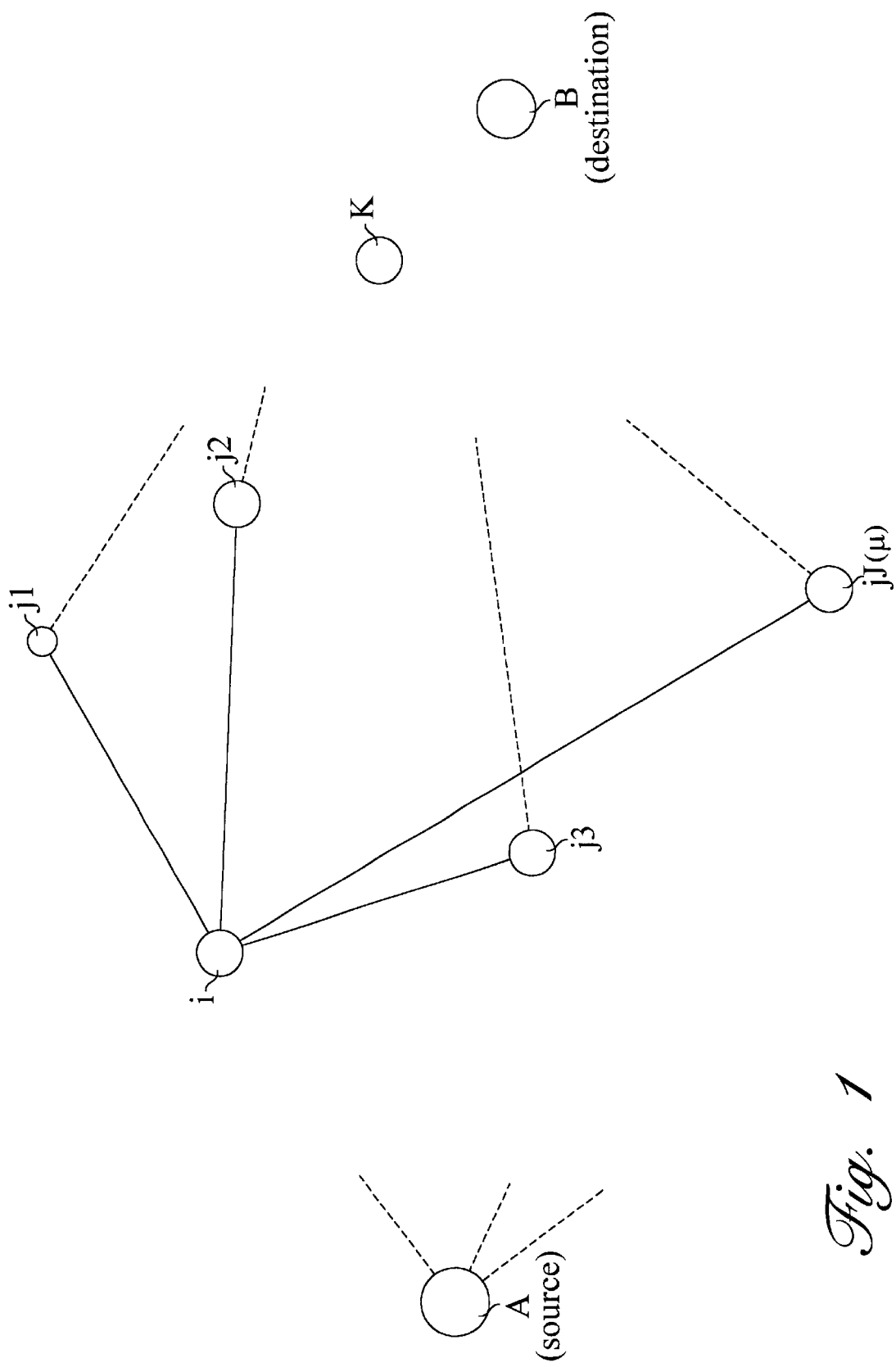
FIG. 1 illustrates operation of the invention in one embodiment.

FIG. 1 illustrates a plurality of nodes $A(\mu)$, $B(\mu)$, i, jq (q=1, 2, . . . , $J(\mu)$; $J(\mu) \geq 2$), where node $A(\mu)$ (e.g., a computer network router) is an ultimate source of an entity (e.g., a packet or a physical good) to be transported on a network and node $B(\mu)$ is an ultimate destination of the entity. Each entity has one or more associated characteristics, indicated collectively by the entity characteristic symbol $\mu$. The node i, which may but need not coincide with the node $A(\mu)$, is directly connected to each of $J=J(\mu)$ distinct intermediate nodes, numbered or labeled j=j1, j2, . . . , jJ($\mu$), along links i–j that are capable of transporting an entity from node i to node j, and each of these connected nodes j is directly or indirectly connected to the node $B(\mu)$ across the network NW.

A set of routing procedures collectively determines how each entity is being routed within the network at a given time, with each routing request to a particular node being handled by a single associated routing procedure. A routing procedure that controls node i uses "proportional routing" if, even absent any explicit communication to induce the routing procedure to do so, the procedure will from time to time select different links for two successive identical entities (e.g., at sequence counts n($\mu$) and n($\mu$)+1 ) that are requested to be routed through node i in identical fashions. Proportional routing associates with a node and a characteristic $\mu$ a non-negative, numerical-valued, (baseline or applied) proportion vector, having one component for each of the $J(\mu)$ i-to-j links available to the routing procedure at that node. Preferably, but not necessarily, each component of each (renormalized) proportion vector has a value between 0.0 and 1.0, and the sum of these values at a given node is 1.0. Different nodes' routing procedures may have the same number or a different number of link choices, depending, for example, on the number of links that directly connect that node with other nodes that are constituents of paths that lead from that node to the ultimate destination node $B(\mu)$.

Where the procedure implements "probabilistic proportional routing", in response to each routing request, the procedure randomly or pseudo-randomly chooses one of its $J(\mu)$ available links, with a probability that is proportional to (or equal to) a component, j=j*($\mu$), of an applied proportion vector, discussed in the following, whose component values are non-negative and represent a measure of probabilities that the routing procedure will choose to transport the entity along the i-to-j link. Where the procedure implements "deterministic proportional routing", in response to each routing request, the procedure chooses one of its allowed routing options, according to a set pattern, based on its previous routing choices and on the applied proportion vector components for that node. The entity is transported on the i-to-j*($\mu$) link.

In a first deterministic routing procedure, referred to as "hard-masked proportional routing", a node i and entity characteristic $\mu$ have associated therewith a baseline proportion vector $p(i;\mu)$, having $J(\mu)$ components, a value $z(i;\mu)$, and a value $z(j;\mu)$ for each node j that is directly connected to the node i, where $\mu$ refers to the characteristic(s) associated with the entity to be transported through the node i. In the simplest situation, the presence of the characteristic $\mu$ may be ignored and all entities transported through the node i may be treated in the same manner.

For example, $z(i;\mu)$ (and, similarly, $z(j;\mu)$) may represent a cost function value for transport of an entity from the node i to the ultimate destination node B. In particular, where the network is a computer network, $z(i;\mu)$ (and, similarly, $z(j;\mu)$) may represent an estimated minimum time or average time or maximum time required for an entity to move from node i to the destination node $B(\mu)$.

More than one baseline proportion vector $p(i;\mu)$ may be associated with the node i, with the particular baseline vector used at a particular time being determined by many factors. These factors may include characteristics of the entity itself, as reflected in the characteristic $\mu$ (e.g., its originating source node and/or its ultimate destination node), time, sequence count, etc. Similarly, more than one value $z(i;\mu)$ (and similarly $z(j;\mu)$) may be associated with the node i at any one time, with each value $z(i;\mu)$ being determined, for example, by one or more characteristics of the entity itself.

The components $p(i;\mu)_j$ of the baseline proportion vector $p(i;\mu)$ may be chosen in many ways. As an example, each node-to-node link i–j (j=j1, j2, ..., jJ($\mu$)) may have a J($\mu$)-component associated current entity traffic value vector $T(i;\mu)$, having components $T(i,j;\mu)$ that are a measure of traffic, and/or a J($\mu$)-component associated current cost value vector $C(i;\mu)$, having components $C(i,j;\mu)$ that are a measure of cost of entity transport, from node i to node j, or from node i to node j to the destination node $B(\mu)$.

One or both of the vectors $T(i;\mu)$ and $C(i;\mu)$ can be used to determine the baseline proportion vector $p(i;\mu)$. As an example, with each link L=L(i,j) in a path from the node i to the ultimate destination $B(\mu)$, the jth component of a baseline proportion vector $p(i;\mu)$ corresponding to choice of that link is associated that reflects one or more environmental conditions. For example, the jth component of the baseline vector $p(i;\mu)$ may be given by the value of a jth component $F_j(T(i;\mu))$ of a vector-valued function of the entity traffic value $T(i;\mu)$ observed or measured or estimated or calculated, where the function $F_j(T(i;\mu))$ has certain desired properties, such as boundedness (e.g., $0 \leq F_j(T(i;\mu)) \leq 1$) and/or monotonicity. For example, if an overall goal of the procedure is to balance the amount of traffic on each link or each path, the function $F_j(T(i;\mu))$ may be chosen to be monotonically decreasing for increasing values of the traffic value $T(i,j;\mu)$ when all other components $T(i,j;\mu)$ ($j \neq j'(\mu)$) are unchanged.

As another example, the jth component of the baseline vector $p(i;\mu)$ may be given by the value of a jth component $G_j(C(i;\mu))$ of a vector-valued function of the cost $C(i;\mu)$ observed or measured or estimated or calculated. This cost, referenced to a particular i-to-j link, may be the maximum or minimum or average bandwidth available (if the entity is to be transported along that link, and if the entity is information expressed in an electronic format), the time delay associated with use of that link, the entity discard rate (at current usage of that link), the entity error rate, the entity misdelivery rate, a financial cost associated with use of that link to transport an entity, priority level of an entity, or some other suitable measure of cost of using the particular link. Again, the function $G_j(C(i;\mu))$ is preferably monotonically decreasing for increasing values of the cost value $C(i,j;\mu)$ when all components $C(i,j;\mu)$ ($j \neq j'(\mu)$) are unchanged.

As an alternative, these components of the baseline proportion vector (in a hard-masked approach and a soft-masked approach discussed in the following) may be set by a human being overseeing the network or may be taken to be an automatically calculated estimate of the cost assessed, or time required, for transport of an entity from the node i along the i-to-j link to the destination node $B(\mu)$. The baseline proportion vector components can also be determined as a result of a reinforcement learning process.

A J($\mu$)-component applied proportion vector (APV) $p'(i;\mu)$ is constructed from the baseline proportion vector $p(i;\mu)$ as follows. For each node j that is directly linked to the node i, each vector component $p'(i;\mu)_j$ for which $z(j;\mu) \geq z(i;\mu)$ is set equal to 0, unless $z(j;\mu) \geq z(i;\mu)$ for all j; for each node j that is directly linked to the node i, each vector component $p'(i;\mu)_j$ for which $z(j;\mu) < z(i;\mu)$ is set equal to $p(i;\mu)_j$. If $z(j;\mu) \geq z(i;\mu)$ for all j, set $p'(i;\mu)_j'' = \rho(i;\mu)_j''$ (a selected positive constant, for example, $\rho(i;\mu)_j'' = 1$) for all nodes j'' for which $z(j'';\mu) = \min_{1 \leq j \leq J(\mu)} \{z(j;\mu)\}$ and $p'(i;\mu)_j = 0$ for all other nodes j.

If, for all nodes i in the network, no entity is ever transported along a link j for which $p'(i;\mu)_j = 0$, and it is true that for all nodes j directly connected to node i, $z(j;\mu) \geq z(i;\mu)$, then no cycle of nodes is possible for which an entity can visit a node twice. The applied proportion vector $p'(i;\mu)_j$ is modified to a re-normalized applied proportion vector (RAPV) with components $p''(i;\mu)_j = p'(i;\mu)_j / R$, where the real number R is chosen so that the sum of the component values $p''(i;\mu)_j$ is 1.0.

In a second deterministic routing procedure, referred to as "soft-masked proportional routing", a node i first calculates an applied proportion vector with components $p'(i;\mu)_j$ as in hard-masked proportional routing. Each non-zero component $p'(i;\mu)_j$ is multiplied by a coefficient $|z(i;\mu)-z(j;\mu)|^m$, to produce a component $p'''(i;\mu)_j$, where m=m(i,j;$\mu$) is a selected real number (preferably, but not necessarily, non-negative), such as m=0.25 or m=1.0. The number m(i,j;$\mu$) may be set as a result of a learning process and/or may depend upon the node numbers i and/or j and/or entity characteristic $\mu$. In one version, m(i,j;$\mu$) is the same constant for all nodes i and j and all characteristics $\mu$. This multiplication produces a modified applied proportion vector (MAPV), $p'''(i;\mu)$, for transport of an entity from node i, with at least one non-zero component. Note that the choice m=0 reproduces the hard-masked routing procedure for $z(i;\mu) \neq z(j;\mu)$.

A re-normalized modified applied proportion vector (RMAPV) with components $p''''(i;\mu)_j = p'''(i;\mu)_j / R'$ is calculated, where the real number R' is chosen so that the sum of the component values $P''''(i;\mu)_j$ is 1.0. If the exponent m(i,j;$\mu$) is the same for all nodes j, the form $|z(i;\mu)-z(j;\mu)|^m$ is the unique multiplicative factor that is invariant under translation and/or rescaling of the vectors $z(i;\mu)$ and $z(j;\mu)$. Thus, for example, if the values $z(i;\mu)$ and $z(j;\mu)$ measure time duration, neither the units in which they measure time nor the units in which these values are initialized will affect the RMAPV.

In a probabilistic approach, the component values $p^*(i;\mu)_j$ (hard-masked or soft-masked) are interpreted as probabilities, and one link L(i;j) is randomly chosen according to these component values. In a deterministic approach, the link L(i,j) chosen for the routing is uniquely determined, based on the component values $p^*(i;\mu)_j$ (preferably renormalized) and other information available to the routing procedure.

Figure 2:
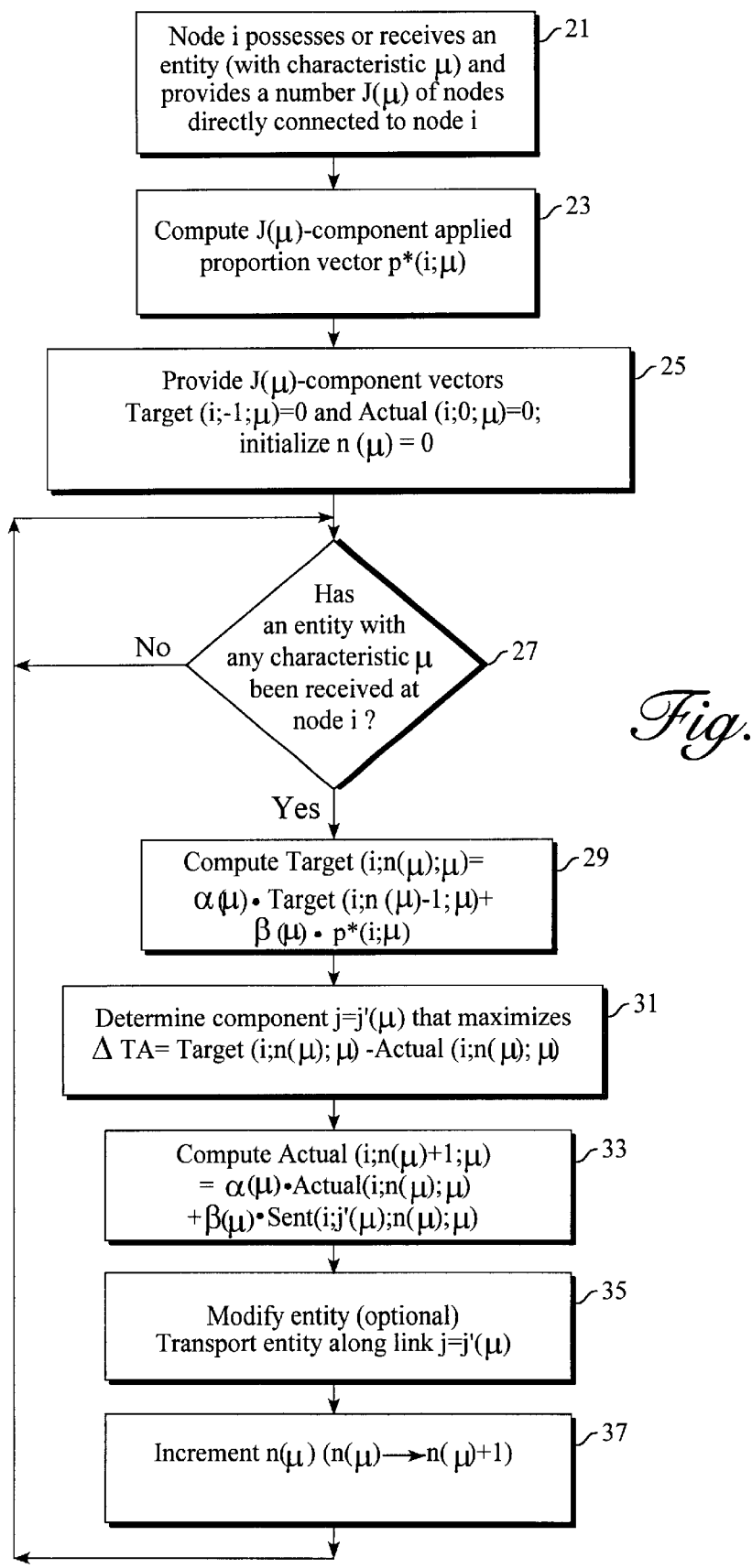
FIG. 2 is a flow chart of a procedure for practicing the invention.

In one embodiment of the invention for deterministic routing, computation of a response to a routing request proceeds as indicated in the flow chart in FIG. 2. In step 21, a node i possesses (or receives) an entity (with associated characteristic $\mu$) to be transported and an associated routing request for the first time and determines, or is provided with, the number $J(\mu)$ of links to the node i, as discussed in the preceding. In step 23, the $J(\mu)$-component applied proportion vector p"(i;$\mu$) (hard-masked) or p""(i;$\mu$) (soft-masked), again referred to collectively herein as p*(i;$\mu$), is computed.

In step 25, two $J(\mu)$-component vectors with all components equal to 0, referred to as Target(i;−1;$\mu$) and Actual (i;0;$\mu$), are provided. A sequence index n=n($\mu$) (=0, 1, 2, . . . ; initially 0) corresponds to the nth time at which an entity with characteristic $\mu$ and associated routing request is received at, or possessed by, the node i. In step 27, the system determines, for all $\mu$, whether an entity with a characteristic $\mu$ has been received at node i. If the answer to the question in step 27 is "no", the system continues to recycle through step 27. If the answer to the question in step 27 is "yes" for some characteristic $\mu$, the system calculates a new Target vector in step 29, $$\text{Target}(i;n(\mu);\mu)=\alpha(\mu)\cdot\text{Target}(i;n(\mu)-1;\mu)+\beta(\mu)\cdot p^*(i;\mu), \quad (1)$$

where Target(i;n($\mu$)−1;$\mu$) typically (but not necessarily) represents the Target vector for the preceding entity with characteristic $\mu$ processed at node i and $\alpha(\mu)$ and $\beta(\mu)$ are selected numbers. Except when special ("gap") circumstances are set for the characteristic $\mu$, the system determines and stores a vector component j=j'($\mu$) that has a maximum difference $$\Delta TA_j = \text{Target}(i;n(\mu);\mu)_j - \text{Actual}(i;n(\mu);\mu)_j, \quad (2)$$

in step 31. In step 33, the system modifies all the components j of the vector Actual(i;n($\mu$)+1;$\mu$), using the selected real numbers $\alpha$ and $\beta$:

$$\text{Actual}(i;n(\mu)+1;\mu)_j=\alpha(\mu)\cdot\text{Actual}(i;n(\mu);\mu)_j+\beta(\mu)\cdot\text{Sent}(i;j'(\mu);n(\mu);\mu)_j, \quad (3)$$

where Sent(i,j'($\mu$);n($\mu$);$\mu$) is a $J(\mu)$-component vector with a value 1 for the j=j'($\mu$) component and a value 0 for all other components.

In step 35, the routing procedure at node i chooses a selected link j=j'($\mu$) in response to the present routing request, stores the value j=j'($\mu$) and associated entity characteristic $\mu$, optionally modifies the entity, and transports the entity along the i-to-j'($\mu$) link. In step 37, the routing procedure increments n($\mu$) (n($\mu$)→n($\mu$)+1) and (optionally) returns to step 27. Note that several different sequence indices n($\mu$) may be used here, one for each different entity characteristic $\mu$, but only one sequence index n($\mu$) is processed in steps 29–37 for each entity that arrives at node i.

Note that the number of links directly connected to the new node j=j'($\mu$) may be the same as, or different from, the number of links directly connected to the node i. Other deterministic routing procedures may also be combined with the construction of the baseline proportion vector and applied proportion vector to determine the i-to-j link to be used.

Special ("gap") circumstances allow entities with the same characteristic $\mu$ to be assuredly transported by the same path, to preserve order in arrival of the entities at a single destination. Where an i-to-j'($\mu$) link has been selected, a gap circumstance may be extant until a reset instruction or command is received for the entity or entities with characteristic $\mu$ being routed, throughout a selected temporal interval, or throughout a consecutive sequence of routing requests received at node i. A gap circumstance may be extant for none, one or many entities with a particular characteristic $\mu$ and may be initiated by receipt of a gap activation signal, which may be contained in a packet header or otherwise associated with an entity that arrives at node i.

When gap circumstances such as these occur, step 31 in the flow chart in FIG. 2 is skipped and the most recently stored value of the selected link j=j'($\mu$) for the entity characteristic $\mu$, rather than the most recently calculated value j=j'($\mu$), is used to specify the link to be used to transport the entity. A gap circumstance, during which step 31 is skipped, may be interleaved with situations where all of the steps 21–37, including step 31, are performed.

A gap circumstance can be terminated by any of several occurrences, including: (1) passage of a time interval having at least a selected threshold length since a selected number of one or more entities with the same characteristic $\mu$ was transported from the source node, (2) transport of a selected number of one or more entities with the same characteristic $\mu$ from the node i, (3) passage of a time interval having at least a selected threshold length since a selected number of one or more entities with the same characteristic $\mu$ was transported from the node i, (4) arrival of a selected number of one or more entities with the same characteristic $\mu$ at the destination node, and (5) reception at the node i of a selected gap inactivation signal.

When one or more selected events occurs, the values Target(i;n($\mu$);$\mu$) and/or Actual(i;n($\mu$);$\mu$) may be "reset", by replacing these vectors by their initial values, Target(i;−1;$\mu$) and/or Actual(i;0;$\mu$), before restarting computation of their values by successive iterations. For example, the specified reset event may occur: (1) when the entity received at node i has been transformed in some manner at node i or at a preceding node in a path from source node A($\mu$) to destination node B($\mu$), (2) when the character of part or all of the network changes, or (3) when a reset activation signal is received or provided at node i. This change in part or all of the network character might arise, for example, from a change in the topology of the network, from a substantial change in network traffic, from a transition of one or more processing nodes from an "up" condition to a "down" condition, or from a transition of one or more processing nodes from a "down" condition to an "up" condition. Reset may also occur in response to receipt at node i of a reset message in a "header" or other message associated with an entity received at node i.

The preceding development identifies the i-to-j'($\mu$) link for entity transport, using a maximum difference of two $J(\mu)$-component vectors, Target and Actual, that are determined iteratively. This development may be generalized to determination of the component j=j'($\mu$) that provides an extremum value (maximum or minimum) of a function H(u,v) that depends upon the component differences, $u_j-v_j$, of two $J(\mu)$-component vectors u and v, where $$u_j=\text{Target}(i;n(\mu);\mu)_j, \quad (4)$$

$$v_j=\alpha(\mu)\cdot\text{Actual}(i;n(\mu);\mu)_j+\beta(\mu)\cdot\text{Sent}(i;j'(\mu);n(\mu);\mu)_j, \quad (5)$$

and where Sent(i,j'($\mu$);n($\mu$);$\mu$) is a $J(\mu)$-component vector with a value 1 for the j=j'($\mu$) component and a value 0 for all other components. For example, the function H(u,v) may be any of the following relationships, or similar relationships involving formation of an extremum (maximum or minimum) with respect to choice of the component j=j'($\mu$):

$$H(u,v) = \max\{a_1(u_1-v_1), a_2(v_2-v_2), \ldots, a_{J(\mu)}(u_{J(\mu)}-v_{J(\mu)})\}, \quad (6A)$$

$$H(u,v) = \min\{a_1(u_1-v_1), a_2(v_2-v_2), \ldots, a_{J(\mu)}(u_{J(\mu)}-v_{J(\mu)})\}, \quad (6B)$$

-continued $$H(u, v) = \sum_{j=1}^{J(\mu)} a_j(u_j - v_j)^2 \qquad (6C)$$

$$H(u, v) = \sum_{j=1}^{J(\mu)} f_j(u_j - v_j), \qquad (6D)$$

where the coefficients $a_j$ are selected non-negative numbers and $f_j$ is a monotonically increasing function of the indicated variables. In the relationships (6A), (6B), (6C) and (6D), the node number, $j=j'(\mu)$, that provides an extremum value (maximum or minimum, as the context requires) is chosen as the node for entity transport. Many functions, H(u,v), in addition to those set forth in (6A)–(6D), can be used to determine a node, $j=j'(\mu)$, for entity transport.

Figure 3:
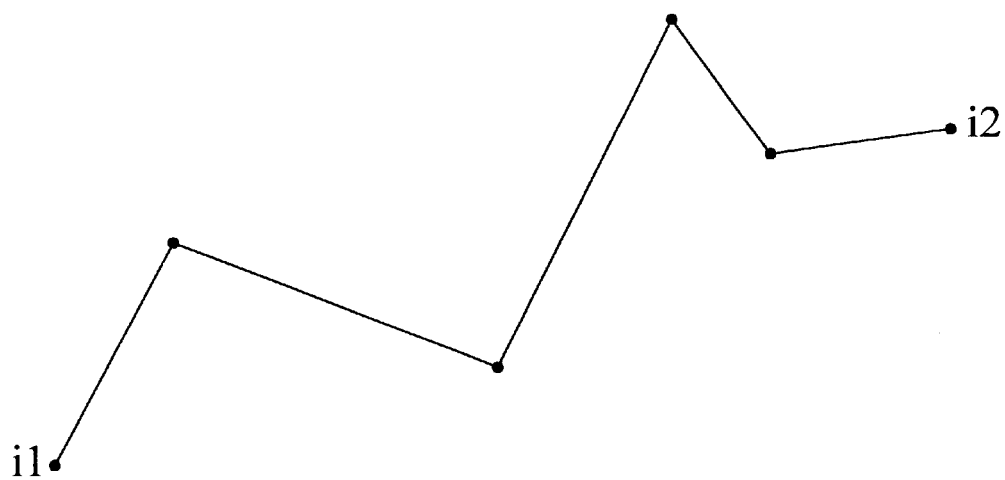
FIGS. 3 and 4 illustrate generalizations of the invention beyond single link-to-link connections.

The preceding development has explicitly restricted itself to single links directly connecting node i to other nodes j. This development extends to a situation where one or more of the connections from node i consists of a collection of two or more consecutive links, joined end-to-end between a first node i1 and a-second node i2, as illustrated in FIG. 3. In this extended situation, the collection of links shown in FIG. 3 is treated as a single super-link. In a new network, including such super-links joining nodes in the original network, the previously developed routing procedure is applied to select a new super-link in the same manner used to select a link in the flow chart in FIG. 2.

Figure 4:
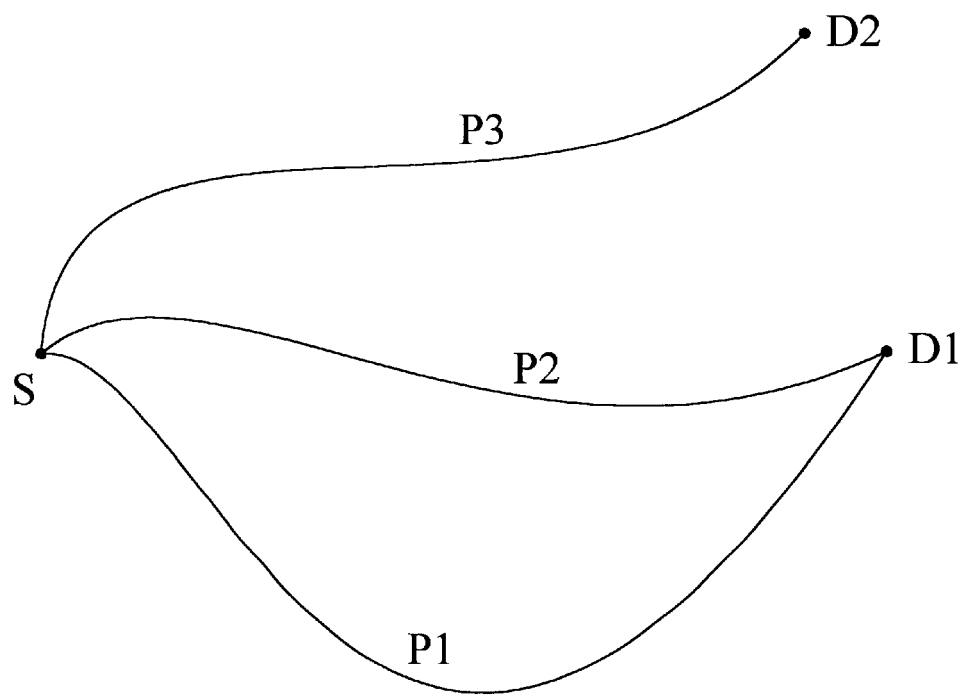

The development can be further generalized by replacing consideration of individual nodes between which an entity is to be transported, with consideration of entity states between which the entity is to be transformed. In this generalization, the underlying network provides a graph of allowed state transitions of the entity, where two entities may have the same source but different destinations or the same destination, as illustrated in FIG. 4. The ultimate destination node now specifies the desired terminal state of the entity. Hard or soft masking can be used to ensure that no entity revisits the same state twice. Proportional routing can be used to manage interference effects between multiple entities that undergo transformations, especially effects that arise when two or more entities share the same state or state transition. The originally described single link embodiment is recovered by associating the state of an entity with a node that possesses or receives the entity.

The routing procedure developed here provides at least four types of benefits. First, computational speed is increased, because the procedure uses primarily sums and multiplications for next link selection and because use of a weight $\alpha$ satisfying $0<\alpha<1$ assigns progressively less weight to past values of a variable such as the Target vector. Second, flexibility is improved, because of avoidance of cycling between nodes, because of provision for "gap" circumstances to preserve order of entity arrival, because of provision for reset of routing variable values, and because of provision for a choice of hard or soft masking. Third, recovery from a shut-down or error event is improved through provision of reset and similar sub-procedures. Fourth, flexibility is also improved through provision for entity transformation and/or change of entity characteristics at a node.

What is claimed is:

1. A method for selecting one or more links for a path to be followed in transporting an entity from a source node to a destination node on a network having N nodes, the method comprising:

for a selected entity and an entity characteristic $\mu$ characterizing at least one of the entity and an associated entity routing request, providing a selected set of N values, $z(k;\mu)$, numbered k=1, 2, ..., N (N≧2), with one value $z(k;\mu)$ being associated with each of N network nodes, numbered k=1, 2, ..., N;

possessing or receiving the entity at one of the nodes, designated i, where each of $J(\mu)$ other nodes, labeled j=j1, j2, ..., jJ($\mu$) ($J(\mu)$≧2), has an i-to-j node link with node i that is capable of transporting the entity from node i to node j, and providing a first J-component vector $p(i;\mu)$ with non-negative selected component values that are a measure of probability that an i-to-j node link may be used to transport the entity from the node i;

determining a second $J(\mu)$-component vector $p'(i;\mu)$ whose jth component is equal to the jth component of the first vector multiplied by a selected number $c(i,j;\mu)$, which depends at most upon $p'(i;\mu)$, $z(i;\mu)$ and $z(j;\mu)$, and is equal to 0 if $z(i;\mu) \leq z(j;\mu)$ and at least one node, designated $j=j^*(\mu)$, satisfies $z(i;\mu)>z(j^*(\mu);\mu)$; and selecting the node j to which to transport the entity from the node i, based upon relative magnitudes of components $p'(i;\mu)_j$ of the second vector.

2. The method of claim 1, further comprising modifying said entity before transporting said entity from said node i to said node $j^*(\mu)$.

3. The method of claim 1, further comprising setting at least one component, designated $j=j^{}(\mu)$ with $z(j^{}(\mu);\mu)=\min_{1 \leq j \leq J(\mu)} z(j;\mu)$, of said second vector $p'(i;\mu)$ equal to a selected positive value $\rho(i;\mu)_{j^{}(\mu)}$, and setting all components, designated $j=j^{*}(\mu)$ for which $z(j^{*}(\mu);\mu) > z(j^{}(\mu);\mu)$, of said second vector $p'(i;\mu)$ equal to 0, when all of said values $z(j;\mu)$ (j=j1, j2, ..., jJ($\mu$)) satisfy $z(j;\mu) \geq z(i;\mu)$.

4. The method of claim 1, further comprising choosing said number $c(i,j;\mu)$ equal to a selected power $m(i,j;\mu)$, which may depend upon at least one of said node number i, said node number j and said characteristic $\mu$, of a magnitude of a difference between said value $z(i;\mu)$ and said value $z(j;\mu)$, for at least one of said nodes j for which $z(i;\mu)>z(j;\mu)$.

5. The method of claim 4, further comprising choosing said selected power $m(i;j;\mu)$ in the range $0<m(i;j;\mu) \leq 1$.

6. The method of claim 4, further comprising choosing said selected power $m(i,j;\mu)=0$.

7. The method of claim 4, further comprising choosing said selected power $m(i,j;\mu)$ to be a positive constant independent of said node numbers i and j and of said characteristic $\mu$.

8. The method of claim 1, further comprising choosing said component values of said first vector $p(i;\mu)$ with reference to at least one of (1) a measure of estimated entity traffic on at least one of said i-to-j node link and a path to said destination node using said i-to-j node link and (2) a measure of an estimated cost of transporting said entity with said characteristic $\mu$ to at least one of said node j and said destination node using said i-to-j node link.

9. The method of claim 1, further comprising determining said component values of said first vector $p(i;\mu)$ with reference to a measure of an estimated cost of transporting said entity to at least one of said node j and said destination node using said i-to-j node link, where the cost is drawn from a group of measures of cost on said network consisting of at least one of: entity throughput, number or rate of discarded entities, entity errors, misdelivered entities, bandwidth available for transport of said entity, minimum time delay for transport of said entity, average time delay for transport of said entity maximum time delay for transport of said entity, priority level of said entity, and financial cost for transport of said entity.

10. The method of claim 1, further comprising determining said component values of said first vector $p(i;\mu)$ with reference to a measure of an estimated cost of transporting said entity, where each of said component values $p(i;\mu)_j$ of said first vector is a monotonically decreasing function of the cost associated with said i-to-j node link when costs on all other links from said node i are unchanged.

11. The method of claim 1, further comprising determining said component values of said first vector $p(i;\mu)$ with reference to a measure of estimated entity traffic, where each of said component values $p(i;\mu)_j$ of said first vector is a monotonically decreasing function of the entity traffic associated with said i-to-j node link when traffic on all other links from said node i is unchanged.

12. The method of claim 1, further comprising choosing at least one of said values $z(i;\mu)$ and $z(j;\mu)$ to correspond to a measure of an estimated cost for transporting said entity from said node i and from said node j, respectively, to said destination node.

13. The method of claim 1, further comprising choosing said entity to be transported to be at least one of a packet, a frame, a cell and a flow control communication in a selected electronic format.

14. The method of claim 1, further comprising choosing said entity to be a physical good that is transported from said source node to said destination node.

15. The method of claim 1, further comprising choosing said entity to be a physical good and choosing said transport of said entity along at least one of said links to be transformation of said entity from a first physical state to a second physical state.

16. The method of claim 1 further comprising choosing said characteristic $\mu$ to include at least one of said source node, said destination node, a priority level associated with said entity, and a time said entity was transported from said source node.

17. The method of claim 1, further comprising selecting said node j to which to transport said entity from said node i by randomly or pseudo-randomly sampling component values of a normalized second vector $p''(i;\mu)=p'(i;\mu)/R$, where R is the sum of said component values of said second vector $p'(i;\mu)$, based on relative magnitudes of the normalized second vector.

18. A system for selecting one or more links for a path to be followed in transporting an entity from a source node to a destination node on a network having N nodes, the system comprising:

a network of N nodes, numbered k=1, 2, ..., N, with $N \geq 2$;

an entity receiving mechanism for possessing or receiving an entity having an associated entity characteristic $\mu$ at one of the nodes, designated i, where each of $J(\mu)$ other nodes, labeled j=j1, j2, ..., jJ($\mu$) ($J(\mu) \geq 2$) in the network has an i-to-j node link with node i that is capable of transporting the entity from node i to node j, where the nodes i and j have respective associated values $z(i;\mu)$ and $z(j;\mu)$; and a computer associated with node i and programmed:

to provide a first J-component vector $p(i;\mu)$ with non-negative selected component values that are a measure of probability that an i-to-j node link may be used to transport the entity from the node i;

to determine a second $J(\mu)$-component vector $p'(i;\mu)$ whose jth component is equal to the jth component of the first vector multiplied by a selected number $c(i,j;\mu)$, which depends at most upon $p'(i;\mu)$, $z(i;\mu)$ and $z(j;\mu)$, and is equal to 0, if $z(i;\mu) \leq z(j;\mu)$ and at least one node, designated $j=j^*(\mu)$, satisfies $z(i;\mu) > z(j^*(\mu);\mu)$; and to select the node j to which to transport the entity from the node i, based upon relative magnitudes of components $p'(i;\mu)_j$ of the second vector.

19. The system of claim 18, wherein said entity is modified before said entity is transported from said node i to said node $j^*(\mu)$.

20. The system of claim 18, wherein said computer is programmed to set at least one component, designated $j=j^{}(\mu)$ with $z(j^{}(\mu);\mu)=\min_{1 \leq j \leq J(\mu)} z(j;\mu)$, of said second vector $p'(i;\mu)$ equal to a selected positive value $\rho(i;\mu)_{j^{}(\mu)}$, and setting all components, designated $j=j^{*}(\mu)$ for which $z(j^{*}(\mu);\mu) > z(j^{}(\mu);\mu)$, of said second vector $p'(i;\mu)$ equal to 0, when all of said values $z(j;\mu)$ (j=j1, j2, ..., jJ($\mu$)) satisfy $z(j;\mu) \geq z(i;\mu)$.

21. The system of claim 20, wherein said computer is programmed to choose said number $c(i,j;\mu)$ equal to a selected power $m(i,j;\mu)$, which may depend upon at least one of said node number i, said node number j and said characteristic $\mu$, of a magnitude of a difference between said value $z(i;\mu)$ and said value $z(j;\mu)$, for at least one of said nodes j for which $z(i;\mu) > z(j;\mu)$.

22. The system of claim 20, wherein said computer is programmed to choose said selected power $m(i;j;\mu)$ in the range $0 < m(i,j;\mu) \leq 1$.

23. The system of claim 20, wherein said computer is programmed to choose said selected power $m(i,j;\mu)=0$.

24. The system of claim 20, wherein said computer is programmed to choose said selected power $m(i,j;\mu)$ to be a positive constant independent of said node numbers i and j and of said characteristic $\mu$.

25. The system of claim 18, wherein said computer is programmed to choose said component values of said first vector $p(i;\mu)$ with reference to at least one of (1) a measure of estimated entity traffic on at least one of said i-to-j node link and a path to said destination node using said i-to-j node link and (2) a measure of an estimated cost of transporting said entity with said characteristic $\mu$ to at least one of said node j and said destination node using said i-to-j node link.

26. The system of claim 18, wherein said computer is programmed to determine said component values of said first vector $p(i;\mu)$ with reference to a measure of an estimated cost of transporting said entity to at least one of said node j and said destination node using said i-to-j node link, where the cost is drawn from a group of measures of cost on said network consisting of at least one of: entity throughput, number or rate of discarded entities, entity errors, misdelivered entities, bandwidth available for transport of said entity, minimum time delay for transport of said entity, average time, delay for transport of said entity, maximum time delay for transport of said entity priority level of said entity and financial cost for transport of said entity.

27. The system of claim 18, wherein said computer is programmed to determine said component values of said first vector $p(i;\mu)$ with reference to a measure of an estimated cost of transporting said entity, where each of said component values $p(i;\mu)_j$ of said first vector is a monotonically decreasing function of the cost associated with said i-to-j node link when costs on all other links from said node i are unchanged.

28. The system of claim 18, wherein said computer is programmed determine said component values of said first vector $p(i;\mu)$ with reference to a measure of estimated entity traffic, where each of said component values $p(i;\mu)_j$ of said first vector is a monotonically decreasing function of the entity traffic associated with said i-to-j node link when traffic on all other links from said node i is unchanged.

29. The system of claim 18, wherein said computer is programmed to choose at least one of said values $z(i;\mu)$ and $z(j;\mu)$ to correspond to a measure of an estimated cost for transporting said entity from said node i and from said node j, respectively, to said destination node.

30. The system of claim 18, wherein said entity to be transported is chosen to be at least one of a packet, a frame, a cell and a flow control communication in a selected electronic format.

31. The system of claim 18, wherein said entity is chosen to be a physical good that is transported from said source node to said destination node.

32. The system of claim 18, wherein said entity is chosen to be a physical good and said transport of said entity along at least one of said links is chosen to be transformation of said entity from a first physical state to a second physical state.

33. The system of claim 18, wherein said characteristic $\mu$ is chosen to include at least one of said source node, said destination node, a priority level associated with said entity, and a time said entity was transported from said source node.

34. The system of claim 18, wherein said computer is programmed to select said node j to which to transport said entity from said node i by randomly or pseudo-randomly sampling component values of a normalized second vector $p''(i;\mu)=p'(i;\mu)/R$, where R is the sum of said component values of said second vector $p'(i;\mu)$, based on relative magnitudes of the normalized second vector.

35. A method for selecting one or more links for a path to be followed in transporting an entity from a source node to a destination node on a network having N nodes, the method comprising:

for a selected entity and an entity characteristic $\mu$ characterizing at least one of the entity and an associated entity routing request, providing a selected set of N values, $z(k;\mu)$, numbered $k=1, 2, \ldots, N$ ($N \geq 2$), with one value $z(k;\mu)$ being associated with each of N network nodes, numbered $k=1, 2, \ldots, N$;

possessing or receiving the entity at one of the nodes, designated i, where each of $J(\mu)$ other nodes, labeled $j=j1, j2, \ldots, jJ(\mu)$ ($J(\mu) \geq 2$), has an i-to-j node link with node i that is capable of transporting the entity from node i to node j, and providing a first $J(\mu)$-component vector $p(i;\mu)$ with selected component values;

determining a second $J(\mu)$-component vector $p'(i;\mu)$ whose jth component is equal to the jth component of the first vector multiplied by a selected number $c(i,j;\mu)$, which depends at most upon $p'(i;\mu)$, $z(i;\mu)$ and $z(j;\mu)$, and is equal to 0 if $z(i;\mu) \leq z(j;\mu)$ and at least one node, designated $j=j^*(\mu)$, satisfies $z(i;\mu) > z(j^*(\mu);\mu)$;

associating a third $J(\mu)$-component vector and a fourth $J(\mu)$-component vector with node i, where the component values of each of the third and fourth vector have selected values before the entity is received at node i;

when the entity is received at the node i, replacing the third vector by the sum of $\alpha(\mu)$ times the third vector plus $\beta(\mu)$ times the second vector, where $\alpha(\mu)$ and $\beta(\mu)$ are selected real numbers;

when at least one of a selected group of circumstances occurs, recalling a stored node value, designated $j=j''''(\mu)$, that is associated with the entity characteristic $\mu$, replacing the fourth vector by the sum of $\alpha(\mu)$ times the fourth vector plus an increment $\beta(\mu)$ times a vector $Sent(i;j''''(\mu);n(\mu);\mu)$, and transporting the entity from the node i to the node $j''''(\mu)$, where $Sent(i,j''''(\mu);n(\mu);\mu)$ is a $J(\mu)$-component vector with a value 1 for the $j=j''''(\mu)$ component and a value 0 for all other components; and when none of the selected group of circumstances occurs, determining and storing at least one vector component, designated $j=j'(\mu)$, that satisfies a selected condition associated with a selected function, $H(u,v)$, of selected differences between component values of the fourth vector, designated as $u_j$, and component values of a sum of $\alpha(\mu)$ times the third vector plus $\beta(\mu)$ times $Sent(i;j'(\mu);n(\mu);\mu)$, designated as $v_j$, replacing the fourth vector by the sum of $\alpha(\mu)$ times the fourth vector plus an increment $\beta(\mu)$ for the component $j=j'(\mu)$, and transporting the entity from the node i to the node $j'(\mu)$.

36. The method of claim 35, further comprising modifying said entity before transporting said entity from said node i to at least one of said node $j'(\mu)$ and said node $j''''(\mu)$.

37. The method of claim 35, further comprising choosing said function $H(u,v)$ and said condition associated with said function $H(u,v)$ from the group of functions and conditions consisting of:

$$H(u, v) = \max\{a_1(u_1 - v_1), a_2(u_2 - v_2), \ldots, a_{J(\mu)}(u_{J(\mu)} - v_{J(\mu)})\}, \quad (1)$$

$$H(u, v) = \min\{a_1(u_1 - v_1), a_2(u_2 - v_2), \ldots, a_{J(\mu)}(u_{J(\mu)} - v_{J(\mu)})\}, \quad (2)$$

$$H(u, v) = \sum_{j=1}^{J(\mu)} a_j \cdot (u_j - v_j)^2, \text{ and} \quad (3)$$

$$H(u, v) = \sum_{j=1}^{J(\mu)} f_j(u_j - v_j), \quad (4)$$

where the values $a_j$ are selected non-negative numbers and each function $f_j$ is a monotonically increasing function of the difference between said components $u_j$ and $v_j$, and where said condition associated with said function $H(u,v)$ includes choosing said node number $j=j'(\mu)$ to achieve an extremum in the value of said function $H(u,v)$.

38. The method of claim 35, further comprising setting at least one component, designated $j=j^{}(\mu)$ with $z(j^{}(\mu);\mu) = \min_{1 \leq j \leq J(\mu)} z(j;\mu)$, of said second vector $p'(i;\mu)$ equal to a selected positive value $\rho(i;\mu)_{j^{}(\mu)}$, and setting all components, designated $j=j^{*}(\mu)$ with $z(j^{*}(\mu);\mu) > z(j^{}(\mu);\mu)$, of said second vector $p'(i;\mu)$ equal to 0, when all of said values $z(j;\mu)$ ($j=j1, j2, \ldots, jJ(\mu)$) satisfy $z(j;\mu) \geq z(i;\mu)$.

39. The method of claim 35, further comprising choosing said number $\alpha(\mu)$ in the range $0 \leq \alpha \leq 1$.

40. The method of claim 35, further comprising choosing said number $\beta(\mu)$ in the range $0 \leq \beta(\mu) \leq 1$.

41. The method of claim 35, further comprising choosing at least one of said number $\alpha(\mu)=0$ and said number $\beta(\mu)=0$.

42. The method of claim 35, further comprising choosing said number $c(i,j;\mu)$ equal to a selected power $m(i,j;\mu)$, which may depend upon at least one of said node number i, said node number j and said characteristic $\mu$, of a magnitude of a difference between said value $z(i;\mu)$ and said value $z(j;\mu)$, for at least one of said nodes j for which $z(i;\mu) > z(j;\mu)$.

43. The method of claim 42, further comprising choosing said selected power $m(i;j;\mu)$ in the range $0 < m(i;j;\mu) \leq 1$.

44. The method of claim 42, further comprising choosing said selected power $m(i,j;\mu)=0$.

45. The method of claim 42, further comprising choosing said selected power $m(i,j;\mu)$ to be a positive constant independent of said node numbers i and j and of said characteristic $\mu$.

46. The method of claim 35, further comprising choosing said component values of said first vector $p(i;\mu)$ with reference to at least one of (1) a measure of estimated entity traffic on at least one of said i-to-j node link and a path to said destination node using said i-to-j node link and (2) a measure of an estimated cost of transporting said entity with said characteristic $\mu$ to at least one of said node j and said destination node using said i-to-j node link.

47. The method of claim 35, further comprising determining said component values of said first vector p(i;$\mu$) with reference to a measure of an estimated cost of transporting said entity to at least one of said node j and said destination node using said i-to-j node link, where the cost is drawn from a group of measures of cost on said network consisting of at least one of: entity throughput, number or rate of discarded entities, entity errors, misdelivered entities, bandwidth available for transport of said entity, minimum time delay for transport of said entity, average time delay for transport of said entity, maximum time delay for transport of said entity, priority level of said entity, and financial cost for transport of said entity.

48. The method of claim 35, further comprising determining said component values of said first vector p(i;$\mu$) with reference to a measure of an estimated cost of transporting said entity, where each of said component values p(i;$\mu$)$_j$ of said first vector is a monotonically decreasing function of the cost associated with said i-to-j node link, when costs on all other links from said node i are unchanged.

49. The method of claim 35, further comprising determining said component values of said first vector p(i;$\mu$) with reference to a measure of estimated entity traffic, where each of said component values p(i;$\mu$)$_j$ of said first vector is a monotonically decreasing function of the entity traffic associated with said i-to-j node link, when traffic on all other links from said node i is unchanged.

50. The method of claim 35, further comprising choosing at least one of said values z(i;$\mu$) and z(j;$\mu$) to correspond to a measure of an estimated cost for transporting an entity from said node i and from said node j, respectively, to said destination node.

51. The method of claim 35, further comprising choosing said entity to be transported to be at least one of a packet, a frame, a cell and a flow control communication in a selected electronic format.

52. The method of claim 35, further comprising choosing said entity to be a physical good that is transported from said source node to said destination node.

53. The method of claim 35, further comprising choosing said entity to be a physical good and choosing said transport of said entity along at least one of said links to be transformation of said entity from a first physical state to a second physical state.

54. The method of claim 35, further comprising choosing said entity characteristic $\mu$ to include at least one of said source node, said destination node, a priority level associated with said entity, and a time said entity was transported from said source node.

55. The method of claim 35, further comprising choosing said selected group of circumstances to be initiated by at least one of (1) transport of a selected number or one or more of said entities with said same characteristic $\mu$ from said source node to said destination node and (2) receipt at said node i of a selected gap activation signal.

56. The method of claim 55, further comprising terminating said selected group of circumstances when a selected number or one or more of the following events occurs: (1) passage of a time interval having at least a selected threshold length since at least one of said one or more entities with said same characteristic $\mu$ was transported from said source node, (2) transport of each of said one or more entities with said same characteristic $\mu$ from said node i, (3) passage of a time interval having at least a selected threshold length since at least one of said one or more entities with said same characteristic $\mu$ was transported from said node i, (4) arrival of each of said one or more entities with said same characteristic $\mu$ at said destination node, and (5) receipt at said node i of a selected gap inactivation signal.

57. The method of claim 35, further comprising resetting said values of each of said third and fourth vectors to selected initial values for said third and fourth vectors in response to receipt at said node i of a reset signal for said entities with said characteristic $\mu$.

58. The method of claim 57, further comprising issuing said reset signal when at least one of the following events occurs: (1) passage of a time interval having at least a selected threshold length since at least one of said entities with said same characteristic $\mu$ was transported from said source node, (2) transport of a selected number of one or more of said entities with said same characteristic $\mu$ from said node i since said third and fourth vectors had said initial values, and (3) passage of a time interval having at least a selected threshold length since said third and fourth vectors had said initial values.

59. A system for selecting one or more links for a path to be followed in transporting an entity from a source node to a destination node on a network having N nodes, the system comprising:

a network of N nodes, numbered k=1, 2, . . . , N, with $N \geq 2$;

an entity receiving mechanism for possessing receiving an entity having an associated entity characteristic $\mu$ at one of the nodes, designated i, where each of J other nodes, labeled j=j1, j2, . . . , jJ($\mu$) (J($\mu$)$\geq$2) in the network has an i-to-j node link with node i that is capable of transporting the entity from node i to node j, where the nodes i and j have respective associated values z(i;$\mu$) and z(j;$\mu$); and a computer associated with node i and programmed:
to provide a first J($\mu$)-component vector p(i;$\mu$) with selected component values;
to determine a second J($\mu$)-component vector p'(i;$\mu$) whose jth component is equal to the jth component of the first vector multiplied by a selected number c(i,j;$\mu$), which depends at most upon p'(i;$\mu$), z(i;$\mu$) and z(j;$\mu$), and is equal to 0 if z(i;$\mu$)$\leq$z(j;$\mu$) and at least one node, designated j=j*($\mu$), satisfies z(i;$\mu$)>z(j*($\mu$);$\mu$);
to associate a third J($\mu$)-component vector and a fourth J($\mu$)-component vector with node i, where the component values of each of the third and fourth vector have selected values before the entity is received at node i,
when the entity is received at the node i, to replace the third vector by the sum of $\alpha(\mu)$ times the third vector plus $\beta(\mu)$ times the second vector, where $\alpha(\mu)$ and $\beta(\mu)$ are selected real numbers;
when at least one of a selected group of circumstances occurs, to recall a stored node value, designated j=j""($\mu$), that is associated with the entity characteristic $\mu$, to replace the fourth vector by the sum of $\alpha(\mu)$ times the fourth vector plus an increment $\beta(\mu)$ times a vector Sent(i;j""($\mu$);n($\mu$);$\mu$), and to transport the entity from the node i to the node j""($\mu$), where Sent(i;j""($\mu$);n($\mu$);$\mu$) is a J($\mu$)-component vector with a value 1 for the j=j""($\mu$) component and a value 0 for all other components; and
when none of the selected group of circumstances occurs, to determine and store at least one vector component, designated j=j'($\mu$), that satisfies a selected condition associated with a selected function, H(u,v), of selected differences between component values of the fourth vector, designated as $u_j$, and component values of a sum of $\alpha(\mu)$ times the third vector plus $\beta(\mu)$ times Sent(i;j($\mu$);n($\mu$);$\mu$), designated as $v_j$, to replace the fourth vector by the sum of $\alpha(\mu)$ times the fourth vector plus an increment $\beta(\mu)$ for the component j=j'($\mu$), and to transport the entity from the node i to the node j'($\mu$).

60. The system of claim 59, wherein said computer is programmed to modify said entity before transporting said entity from said node i to said node j'($\mu$) or said node j'''($\mu$).

61. The system of claim 59, wherein said computer is programmed to choose said function H(u,v) and said condition associated with said function H(u,v) from the group of functions and conditions consisting of:

$$H(u, v) = \max\{a_1(u_1 - v_1), a_2(u_2 - v_2), \ldots, a_{J(\mu)}(u_{J(\mu)} - v_{J(\mu)})\}, \quad (1)$$

$$H(u, v) = \min\{a_1(u_1 - v_1), a_2(u_2 - v_2), \ldots, a_{J(\mu)}(u_{J(\mu)} - v_{J(\mu)})\}, \quad (2)$$

$$H(u, v) = \sum_{j=1}^{J(\mu)} a_j \cdot (u_j - v_j)^2, \text{ and} \quad (3)$$

$$H(u, v) = \sum_{j=1}^{J(\mu)} f_j(u_j - v_j), \quad (4)$$

where the values $a_j$ are selected non-negative numbers and each function $f_j$ is a monotonically increasing function of the difference between said components $u_j$ and $v_j$, and where said condition associated with said function H(u,v) includes choosing said node number j=j'($\mu$) to achieve an extremum in the value of said function H(u,v).

62. The system of claim 59, wherein said computer is programmed to set at least one component, designated j=j($\mu$) with z(j($\mu$);$\mu$)=$\min_{1 \leq j \leq J(\mu)}$z(j;$\mu$), of said second vector p'(i;$\mu$) equal to a selected positive value $\rho$(i;$\mu$)j$_{(\mu)}$, and to set all components, designated j=j*($\mu$) with z(j*($\mu$);$\mu$)>z(j($\mu$);$\mu$), of said second vector p'(i;$\mu$) equal to 0, when all of said values z(j;$\mu$) (j=j1, j2, . . . , jJ($\mu$)) satisfy z(j;$\mu$)$\geq$z(i;$\mu$).

63. The system of claim 59, wherein said computer is programmed to choose said number $\alpha(\mu)$ in the range $0 \leq \alpha \leq 1$.

64. The system of claim 59, wherein said computer is programmed to choose said number $\beta(\mu)$ in the range $0 \leq \beta(\mu) \leq 1$.

65. The system of claim 59, wherein said computer is programmed to choose at least one of said number $\alpha(\mu)$=0 and said number $\beta(\mu)$=0.

66. The system of claim 59, wherein said computer is programmed to choose said number c(i,j;$\mu$) equal to a selected power m(i,j;$\mu$), which may depend upon at least one of said node number i, said node number j and said characteristic $\mu$, of a magnitude of a difference between said value z(i;$\mu$) and said value z(j;$\mu$), for at least one of said nodes j for which z(i;$\mu$)>z(j;$\mu$).

67. The system of claim 66, wherein said computer is programmed to choose said selected power m(i;j;$\mu$) in the range 0<m(i;j;$\mu$)$\leq$1.

68. The system of claim 66, wherein said computer is programmed to choose said selected power m(i,j;$\mu$)=0.

69. The system of claim 66, wherein said computer is programmed to choose said selected power m(i,j;$\mu$) to be a positive constant independent of said node numbers i and j and of said characteristic $\mu$.

70. The system of claim 59, wherein said computer is programmed to choose said component values of said first vector p(i;$\mu$) with reference to at least one of (1) a measure of estimated entity traffic on at least one of said i-to-j node link and a path to said destination node using said i-to-j node link and (2) a measure of an estimated cost of transporting said entity with said characteristic $\mu$ to at least one of said node j and said destination node using said i-to-j node link.

71. The system of claim 59, wherein said computer is programmed to determined said component values of said first vector p(i;$\mu$) with reference to a measure of an estimated cost of transporting said entity to at least one of said node j and said destination node using said i-to-j node link, where the cost is drawn from a group of measures of cost on said network consisting of at least one of: entity throughput, number or rate of discarded entities, entity errors, misdelivered entities, bandwidth available for transport of said entity, minimum time delay for transport of said entity, average time delay for transport of said entity, maximum time delay for transport of said entity, priority level of said entity, and financial cost for transport of said entity.

72. The system of claim 59, wherein said computer is programmed to determine said component values of said first vector p(i;$\mu$) with reference to a measure of an estimated cost of transporting said entity, where each of said component values p(i;$\mu$)$_j$ of said first vector is a monotonically decreasing function of the cost associated with said i-to-j node link when costs on all other links from said node i are unchanged.

73. The system of claim 59, wherein said computer is programmed to determine said component values of said first vector p(i;$\mu$) with reference to a measure of estimated entity traffic, where each of said component values p(i;$\mu$)$_j$ of said first vector is a monotonically decreasing function of the entity traffic associated with said i-to-j node link, when traffic on all other links from said node i is unchanged.

74. The system of claim 59, wherein said computer is programmed to choose at least one of said values z(i;$\mu$) and z(j;$\mu$) to correspond to a measure of an estimated cost for transporting an entity from said node i and from said node j, respectively, to said destination node.

75. The system of claim 59, wherein said entity to be transported to be at least one of a packet, a frame, a cell and a flow control communication in a selected electronic format.

76. The system of claim 59, wherein said entity is a physical good that is transported from said source node to said destination node.

77. The system of claim 59, wherein said entity is a physical good and transport of said entity along at least one of said links corresponds to transformation of said entity from a first physical state to a second physical state.

78. The system of claim 59, wherein said entity characteristic $\mu$ includes at least one of said source node, said destination node, a priority level associated with said entity, and a time said entity was transported from said source node.

79. The system of claim 59, wherein said computer is programmed to choose said selected group of circumstances to be initiated by at least one of (1) transport of a selected number or one or more of said entities with said same characteristic $\mu$ from said source node to said destination node and (2) receipt at said node i of a selected gap activation signal.

80. The system of claim 79, wherein said computer is programmed to terminate said selected group of circumstances when at least one of the following events occurs: (1) passage of a time interval having at least a selected threshold length since at least one of said one or more entities with said same characteristic $\mu$ was transported from said source node, (2) transport of each of said one or more entities with said same characteristic $\mu$ from said node i, (3) passage of a time interval having at least a selected threshold length since at least one of said one or more entities with said same characteristic $\mu$ was transported from said node i, (4) arrival of each of said one or more entities with said same characteristic $\mu$ at said destination node, and (5) receipt at said node i of a selected gap inactivation signal.

81. The system of claim 59, wherein said computer is programmed to reset said values of each of said third and fourth vectors to selected initial values for said third and fourth vectors in response to receipt at said node i of a reset signal for said entities with said characteristic $\mu$.

82. The system of claim 81, wherein said computer is programmed to issue said reset signal when at least one of the following events occurs: (1) passage of a time interval having at least a selected threshold length since at least one of said entities with said same characteristic $\mu$ was transported from said source node, (2) transport of a selected number of one or more of said entities with said same characteristic $\mu$ from said node i since said third and fourth vectors had said initial values, and (3) passage of a time interval having at least a selected threshold length since said third and fourth vectors had said initial values.

* * * * *